HIGH-FREQUENCY PREEMPHASIS FOR PULSE CODE MODULATION

Filed June 19, 1948

INVENTOR.
PIERRE R. AIGRAIN

BY

ATTORNEY

Patented Dec. 9, 1952

2,621,251

UNITED STATES PATENT OFFICE 2,621,251

HIGH-FREQUENCY PREEMPHASIS FOR PULSE CODE MODULATION

Pierre Raoul Aigrain, New York, N. Y., assignor to International Standard Electric Corporation, New York, N. Y., a corporation of Delaware Application June 19, 1948, Serial No. 34,098

4 Claims. (Cl. 178—43.5)

Figure 1:
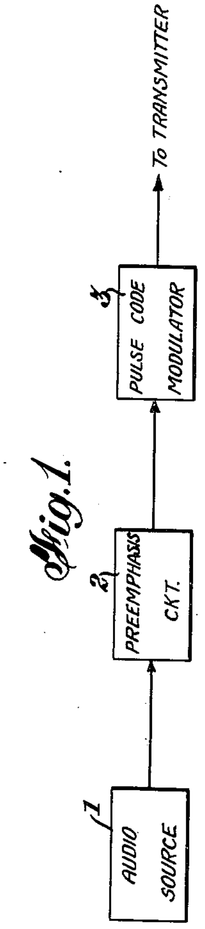

This invention relates to radio communication systems and more particularly to such systems employing quantizing circuits as for instance required for converting amplitude into pulse code modulation.

In most methods of pulse modulation the modulating signal is sampled at fairly regular intervals. Likewise with most methods of pulse modulation all levels of the modulating signal between zero and maximum are transmitted in the sampling process. However, the terms "quantizing" and "quantized" are applied to systems which in addition to time sampling, transmit only selected levels of the amplitude of the signal. With such a system, the amplitude range of the modulating signal is divided into a number of discrete levels. If the instantaneous amplitude of the signal falls between two levels, either the upper or lower level is transmitted depending on which is closer to the signal amplitude.

In quantizing amplitude modulated signals for the purpose of converting into pulse or similar code modulation, the experience has been that the signal undergoes a certain amount of distortion, since average levels rather than the true signal is utilized for conversion into, say, a pulse code. The distortion thus introduced by quantization, will be as experience shows, inversely proportional to the number of levels present in the interval between a maximum and a minimum value for the input signal oscillations. These signals are at a given instant one of the four following types:

1. Irregular, noiselike oscillations of small amplitude ($\frac{1}{10}$ maximum) which when harmonically analyzed are found to contain only high frequencies. (2000 c. p. s. and above.)

2. Regular oscillations of small amplitude (.1 of maximum) which can be decomposed into the sum of a few sine waves of high frequency. (Around 200 c. p. s.)

3. Regular oscillations of large amplitude (.9 of maximum) containing only low frequencies.

4. Oscillations which can be considered as the sum of (2) and (3). When fed into a conventional pulse code modulation system, only the signals of type (3) and (4) will make use of all the levels. They will thus be transmitted with the minimum of relative distortion, but the signals of type (1) and (2), because of their small amplitude, will be greatly distorted.

It is proposed to circumvent this difficulty by making use of the following facts:

1. The low amplitude signals contain only high frequencies while the high amplitude signals contain mainly low frequencies.

2. The quantization of a signal containing only high frequencies introduces distortion which is itself mainly in the high frequency region.

It is an object of the present invention to provide a communication system of the type above referred to wherein the audio signal before being quantized for the purpose of coding is subjected to a translation which will emphasize the high frequency components thereof with respect to the low frequency components such that the high and low frequency components will be brought to approximately the same maximum amplitude.

It is also an object to provide a receiver for such a system which includes means for the deemphasizing such high frequency components for the purpose of properly restoring the original signal.

In accordance with certain features of the invention I provide in an amplitude modulated signal translator system such as a transmitter which includes a signal quantizer, a circuit for preemphasizing the high frequency components of the audio signals being translated and supplied to the quantizer. A corresponding de-emphasizing circuit is provided in associated receiver which includes a decoding circuit having an amplitude modulated audio output.

Figure 3:
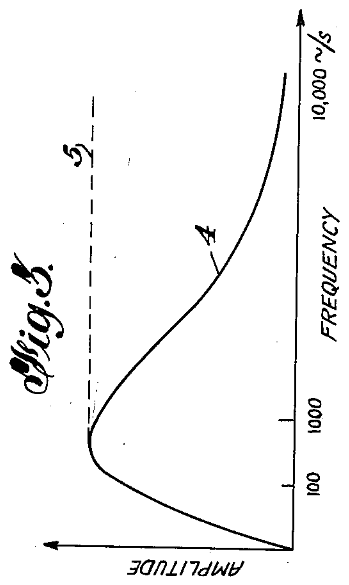
Figure 2:
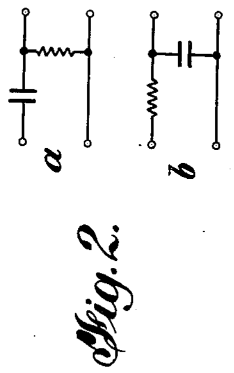
Figure 4:
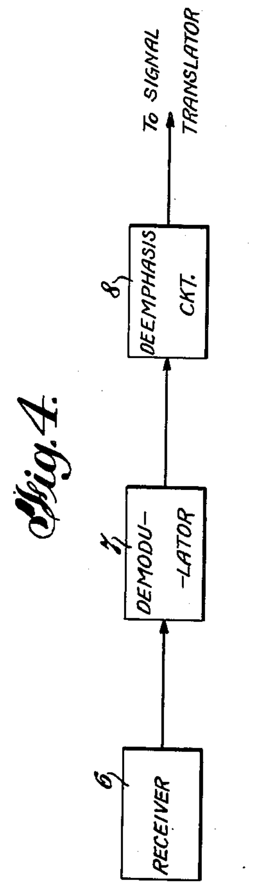

The above-mentioned and other features and objects of the invention will become more apparent and the invention itself, though not necessarily defined by said features and objects, will be clearly understood by reference to the following description of an embodiment of the invention taken in connection with the accompanying drawings wherein:

Fig. 1 represents a diagram in block-form of an audio signal transmitter in accordance with the invention;

Fig. 2 includes a schematic representation of a pre-emphasizing and a de-emphasizing circuit for high frequency audio components;

Fig. 3 is a graphical representation of a frequency characteristic illustrating certain operative phenomena of the circuit of Fig. 1; and Fig. 4 is block diagram of a receiver for a system in accordance with the invention.

Referring now to the diagram of Fig. 1 a source of audio signals is indicated at 1 which feeds into a pre-emphasizer circuit 2 which may be of the type shown at *a* in Fig. 2. The signal thus distorted in favor of the high frequency components is supplied to a pulse code modulator 3 which, in accordance with well known practice includes a signal quantizer and a pulse coder. The resultant pulse groups representing the quantizing or sampling level values are then fed to a transmitter which has not been shown.

The pre-emphasizing circuit for the high frequency components as shown in Fig. 2a may comprise a suitable capacity-resistance filter combination which is effective in changing the amplitudes of the high frequency components in accordance with the amplitude-frequency relationship shown graphically in Fig. 3, wherein 4 indicates the characteristic normally possessed by the original audio signal, and 5 indicates the approximate relationship of the various frequency components after their subjection to the pre-emphasizing circuit 2.

In the associated receiver circuit, shown in Fig. 4 which may assume any suitable form for reproducing the original signal from the pulse code into amplitude modulation, a de-emphasizing circuit in accordance with b of Fig. 2 may be employed. The receiver circuit includes a receiver 6, a pulse to amplitude demodulator 7 and a de-emphasis circuit 8.

From the above it will be apparent that the use of a high frequency emphasis network at the transmitting end, and a corresponding de-emphasis network at the receiving end can reduce the distortion introduced by quantization in a very economical way.

It may also be noted that pre-emphasis has already been used in conjunction with amplitude modulation and frequency modulation systems, but with an entirely different purpose, since these communication systems are essentially distortionless.

While I have described above the principles of my invention in connection with specific apparatus, such as a pulse code modulator, it is to be clearly understood that this description is made only by way of example and not as a limitation on the scope of my invention, as the concept of using pre-emphasis of high frequency components is to include any system using a quantizer.

I claim:

1. A radio system for minimizing the distortion of the high frequency components of an amplitude modulated signal due to quantizing comprising a source of an audio signal wave having components of relatively high frequency, a circuit for pre-emphasizing said high frequency commonents of said source relative to the low frequency components thereof, and signal translating means including a quantizer.

2. A system according to claim 1, wherein said signal translator comprises a pulse code modulator.

3. A system according to claim 1, wherein said pre-emphasizing circuit comprises a condenser-capacity filter.

4. A system according to claim 1, wherein said signal translator comprises a pulse code modulator, further including a signal receiver including a pulse code decoder and a high frequency signal component de-emphasizing circuit.

PIERRE RAOUL AIGRAIN.

REFERENCES CITED

The following references are of record in the file of this patent:

UNITED STATES PATENTS

| Number | Name | Date |
|---|---|---|
| Re. 21,660 | Armstrong | Dec. 17, 1940 |
| 1,743,132 | Green | Jan. 14, 1930 |
| 2,212,338 | Bown | Aug. 20, 1940 |
| 2,362,000 | Tunick | Nov. 7, 1944 |
| 2,392,546 | Peterson | Jan. 8, 1946 |
| 2,397,157 | Roberts | Mar. 26, 1946 |
| 2,465,448 | Hamsell | Mar. 29, 1949 |

OTHER REFERENCES

"Electronics," December, 1947, pages 126–131.

"Bell Laboratories Record," July, 1947, pages 265–268.

"Radiocraft," February, 1948, pages 28–30, 47.

"An Experimental Multi-channel Pulse Code Modulation System of Toll Quality" by L. A. Meacham and E. Peterson, Bell System Technical Journal, vol. 27, pp. 1 to 43, Jan. 1948.